(12) United States Patent
Niitani (10) Patent No.: US 10,315,251 B2
(45) Date of Patent: Jun. 11, 2019

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventor: Haruhiko Niitani, Shiga (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 328 days.

(21) Appl. No.: 15/124,601

(22) PCT Filed: Mar. 25, 2016

(86) PCT No.: PCT/JP2016/059764
§ 371 (c)(1),
(2) Date: Sep. 8, 2016

(87) PCT Pub. No.: WO2017/163429
PCT Pub. Date: Sep. 28, 2017

(65) Prior Publication Data
US 2018/0141121 A1    May 24, 2018

(51) Int. Cl.
*B22F 3/105* (2006.01)
*G01J 5/00* (2006.01)
(Continued)

(52) U.S. Cl.
CPC .............. *B22F 3/1055* (2013.01); *B22F 3/24* (2013.01); *B33Y 30/00* (2014.12); *G01J 5/004* (2013.01);
(Continued)

(58) Field of Classification Search
CPC .......... B22F 2999/00; B22F 2003/1056; B22F 3/1055; B29C 64/153
(Continued)

(56) References Cited

U.S. PATENT DOCUMENTS 6,995,334 B1    2/2006   Kovacevic et al.
9,327,450 B2    5/2016   Hein et al.
(Continued)

FOREIGN PATENT DOCUMENTS

JP    2005-537134 A    12/2005
JP    2010-509092 A    3/2010
(Continued)

OTHER PUBLICATIONS

International Search Report (ISR) dated Jun. 21, 2016 for International Application No. PCT/JP2016/059764.
(Continued)

*Primary Examiner* — Jonathan Han
(74) *Attorney, Agent, or Firm* — Ladas & Parry LLP (57) ABSTRACT

A high-precision three-dimensional laminated and shaped object is shaped based on a captured image. A three-dimensional laminating and shaping apparatus includes a material ejector that ejects a material of a three-dimensional laminated and shaped object onto a shaping table, a light beam irradiator that irradiates the ejected material with a light beam, an image capturer that captures a molten pool formed by irradiating the ejected material with the light beam, a scanning direction determiner that determines a scanning direction of the light beam with respect to a shaped (Continued)

object based on a change in a position of the shaping table, a detector that detects the molten pool based on an image captured by the image capturer and the scanning direction, and a shaping controller that controls at least one of an output of the light beam and a scanning speed of the light beam based on the detected molten pool.

11 Claims, 7 Drawing Sheets

(51) Int. Cl.
| | |
|---|---|
| G06T 7/40 | (2017.01) |
| B33Y 30/00 | (2015.01) |
| B22F 3/24 | (2006.01) |
| B33Y 10/00 | (2015.01) |
| B33Y 50/02 | (2015.01) |

(52) U.S. Cl.
CPC ........ *G06T 7/40* (2013.01); *B22F 2003/1057* (2013.01); *B22F 2003/247* (2013.01); *B22F 2203/03* (2013.01); *B22F 2203/11* (2013.01); *B22F 2998/10* (2013.01); *B22F 2999/00* (2013.01); *B33Y 10/00* (2014.12); *B33Y 50/02* (2014.12); *G01J 2005/0077* (2013.01); *Y02P 10/295* (2015.11)

(58) Field of Classification Search
USPC .............................. 264/497; 425/147.4, 135
See application file for complete search history.

(56) References Cited

U.S. PATENT DOCUMENTS

| | | | |
|---|---|---|---|
| 2006/0032840 A1* | 2/2006 | Bagavath-Singh ... | B22F 3/1055 219/121.64 |
| 2008/0314878 A1 | 12/2008 | Cai et al. | |
| 2010/0006228 A1* | 1/2010 | Abe ...................... | B33Y 30/00 156/356 |
| 2010/0031882 A1* | 2/2010 | Abe ...................... | B05C 19/04 118/620 |
| 2014/0163717 A1 | 6/2014 | Das et al. | |
| 2015/0090074 A1 | 4/2015 | Etter et al. | |
| 2015/0321422 A1 | 11/2015 | Boyer | |

FOREIGN PATENT DOCUMENTS

| | | | | |
|---|---|---|---|---|
| JP | 2015-66599 A | | 4/2015 | |
| JP | 2015-196265 A | | 11/2015 | |
| JP | 2015196265 A | * | 11/2015 | ......... B23K 26/1476 |
| JP | 2016-502603 A | | 1/2016 | |
| WO | 2004/020139 A1 | | 3/2004 | |
| WO | 2008/055615 A1 | | 5/2008 | |
| WO | 2014/074947 A2 | | 5/2014 | |
| WO | 2015/120047 A1 | | 8/2015 | |
| WO | 2015/151865 A1 | | 10/2015 | |

OTHER PUBLICATIONS

Written Opinion (WO) dated Jun. 21, 2016 for International Application No. PCT/JP2016/059764.
J-PlatPat English abstract of JP 2015/196265 A.
J-PlatPat English abstract of JP 2015-66599 A.
J-PlatPat English abstract of JP.
Supplementary European Search Report (SESR) dated Oct. 12, 2018 in connection with European Patent Application No. 16 82 6690.6.
Griffith, M.L., et al., "Understanding thermal behavior in the LENS process", Materials and Design, vol. 20, No. 2-3, May 25, 1999, pp. 107-113.
Flynn, J. M., et al., "Hybrid additive and subtractive machine tools—Research and industrial developments", International Journal of Machine Tools & Manufacture, vol. 101, Nov. 22, 2015, pp. 79-101.
Everton, S. K., et al., "Review of in-situ process monitoring and in-situ metrology for metal additive manufacturing", Materials and Design, vol. 95, Jan. 23, 2016, pp. 431-445.
Reutzel, E. W., et al., "A survey of sensing and control systems for machine and process monitoring of directed-energy, metal-based additive manufacturing", Rapid Prototyping Journal, vol. 21, No. 2, Mar. 16, 2015, pp. 159-167.

* cited by examiner

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is an application under 35 U.S.C. 371 of International Application No. PCT/JP2016/059764 filed on Mar. 25, 2016, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of measuring the surface temperature of a recoated powder layer by an infrared camera.

CITATION LIST

Patent Literature

Patent literature 1: Japanese Patent Laid-Open No. 2010-509092

SUMMARY OF THE INVENTION

Technical Problem

In the technique described in the above literature, however, it is impossible to shape a high-precision three-dimensional laminated and shaped object based on an image captured by the infrared camera.

The present invention enables to provide a technique of solving the above-described problem.

Solution to Problem

One aspect of the present invention provides a three-dimensional laminating and shaping apparatus comprising:
a material ejector that ejects a material of a three-dimensional laminated and shaped object onto a shaping table;
a light beam irradiator that irradiates the ejected material with a light beam;
an image capturer that captures a molten pool formed by irradiating the ejected material with the light beam;
a scanning direction determiner that determines a scanning direction of the light beam with respect to a shaped object based on a change in a position of the shaping table;
a detector that detects the molten pool based on an image captured by the image capturer and the scanning direction; and
a shaping controller that controls at least one of an output of the light beam and a scanning speed of the light beam based on the detected molten pool.

Another aspect of the present invention provides a three-dimensional laminated and shaped object shaping method comprising:
ejecting a material of a three-dimensional laminated and shaped object onto a shaping table;
irradiating the ejected material with a light beam;
capturing a molten pool formed by irradiating the ejected material with the light beam;
determining a scanning direction of the light beam with respect to a shaped object based on a change in a position of the shaping table;
detecting the molten pool based on an image captured by an image capturer and the scanning direction; and
controlling at least one of an output of the light beam and a scanning speed of the light beam based on the detected molten pool.

Still other aspect of the present invention provides a three-dimensional laminated and shaped object shaping program for causing a computer to execute a method, comprising:
ejecting a material of a three-dimensional laminated and shaped object onto a shaping table;
irradiating the ejected material with a light beam;
capturing a molten pool formed by irradiating the ejected material with the light beam;
determining a scanning direction of the light beam with respect to a shaped object based on a change in a position of the shaping table;
detecting the molten pool based on an image captured by an image capturer and the scanning direction; and
controlling at least one of an output of the light beam and a scanning speed of the light beam based on the detected molten pool.

Advantageous Effects of Invention

According to the present invention, it is possible to shape a high-precision three-dimensional laminated and shaped object based on a captured image.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

A three-dimensional laminating and shaping apparatus 100 according to the first embodiment of the present invention will be described with reference to FIG. 1. The three-dimensional laminating and shaping apparatus 100 is an apparatus for shaping a three-dimensional laminated and shaped object by ejecting a material 130 onto a shaping table 120, and irradiating the ejected material 130 with a light beam 140.

Figure 1:
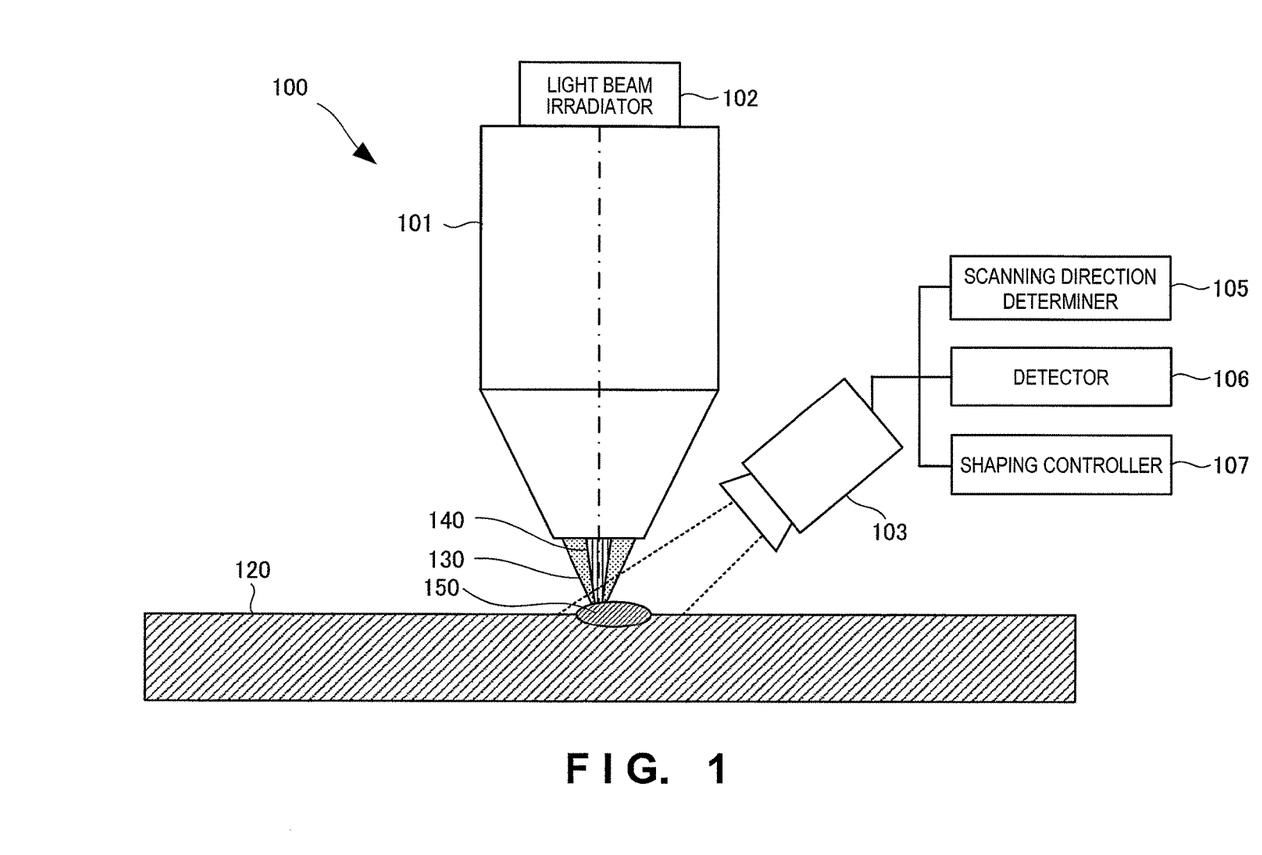
FIG. 1 is a view schematically showing the arrangement of a three-dimensional laminating and shaping apparatus according to the first embodiment of the present invention.

As shown in FIG. 1, the three-dimensional laminating and shaping apparatus 100 includes a material ejector 101, a light beam irradiator 102, an image capturer 103, a scanning direction determiner 105, a detector 106, and a shaping controller 107.

The material ejector 101 ejects the material 130 of the three-dimensional laminated and shaped object onto the shaping table 120. The light beam irradiator 102 irradiates the ejected material 130 with the light beam 140. The image capturer 103 captures a molten pool 150 of the material 130, which is formed by irradiating the material 130 with the light beam 140. The scanning direction determiner 105 determines the scanning direction of the light beam 140 based on the position of the shaping table 120. The detector 106 determines the shape of the molten pool 150 based on the scanning direction of the molten pool 150. The shaping controller 107 controls at least one of the output of the light beam 140 and the scanning speed of the light beam 140 based on the detected molten pool 150.

According to this embodiment, it is possible to shape a high-precision three-dimensional laminated and shaped object based on an image captured by a camera or the like.

[Second Embodiment]

Figure 2:
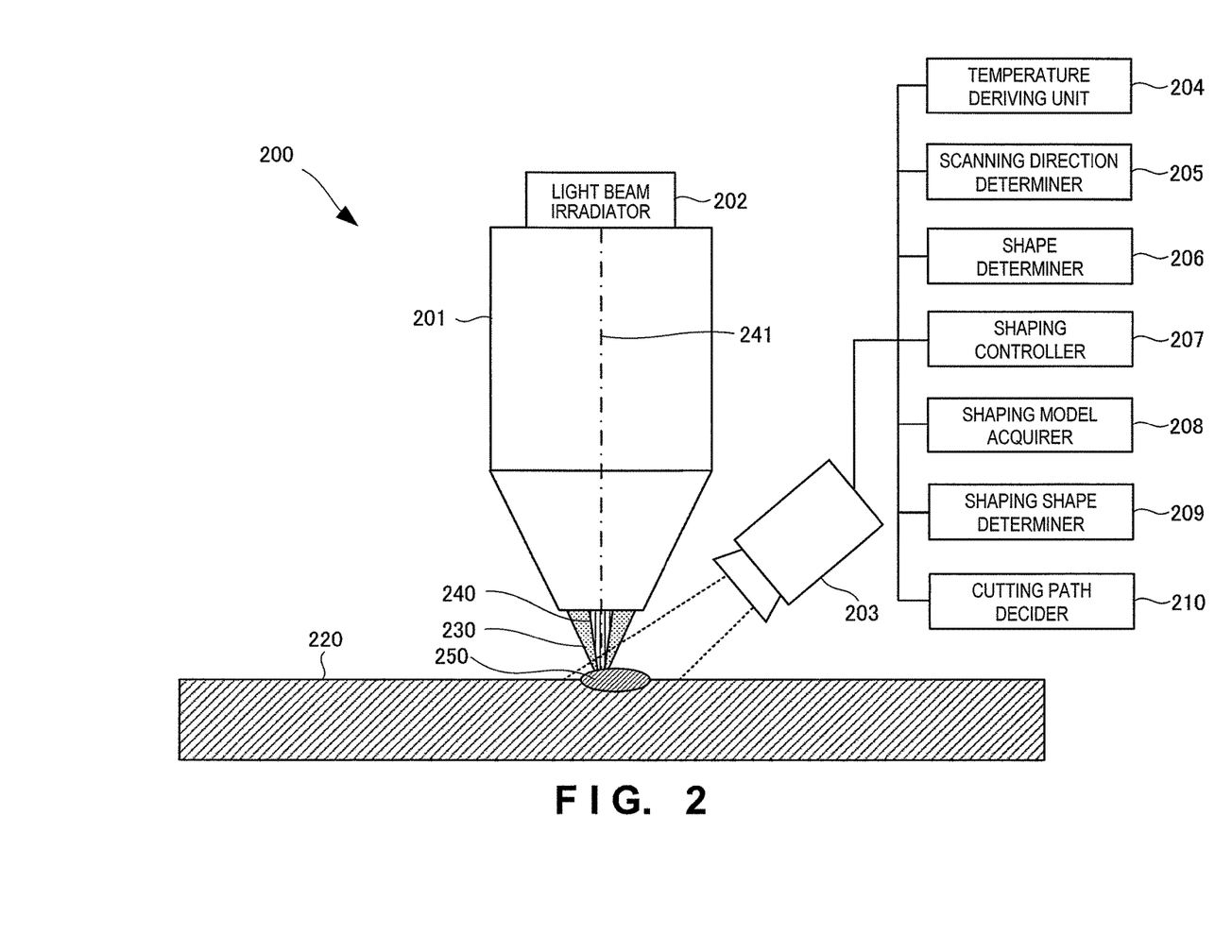
FIG. 2 is a view schematically showing the arrangement of a three-dimensional laminating and shaping apparatus according to the second embodiment of the present invention.

A three-dimensional laminating and shaping apparatus 200 according to the second embodiment of the present invention will be described with reference to FIGS. 2 to 5. FIG. 2 is a view for schematically explaining the arrangement of the three-dimensional laminating and shaping apparatus 200 according to this embodiment.

The three-dimensional laminating and shaping apparatus 200 includes an ejection nozzle 201, a light beam irradiator 202, a camera 203, a temperature deriving unit 204, a scanning direction determiner 205, a shape determiner 206, and a shaping controller 207. The three-dimensional laminating and shaping apparatus 200 further includes a shaping model acquirer 208, a shaping shape determiner 209, and a cutting path decider 210.

The ejection nozzle 201 ejects a metal powder as a material 230 of a three-dimensional laminated and shaped object onto a shaping table 220. The light beam irradiator 202 irradiates the material 230 with a light beam 240 from the distal end portion of the ejection nozzle 201. The material 230 irradiated with the light beam 240 such as a laser beam or electron beam is melted by heat applied from the light beam 240, thereby forming a molten pool 250.

An image (video) of the molten pool 250 is captured by an image capturing apparatus such as the camera 203 obliquely arranged on the side of the ejection nozzle 201. Note that the camera 203 may be arranged on the same axial as an optical axis 241 of the light beam 240. The camera 203 is used as an image capturing apparatus in this example. The present invention, however, is not limited to a camera for capturing visible light, and any apparatus capable of capturing infrared light or a light beam of another wavelength may be used.

In the three-dimensional laminating and shaping apparatus 200 according to this embodiment, the shaping table 220 moves on the X-Y plane (in the X and Y directions). Note that the three-dimensional laminating and shaping apparatus 200 according to this embodiment is configured so that the ejection nozzle 201 is fixed and the shaping table 220 moves. To the contrary, the shaping table 220 may be fixed and the ejection nozzle 201 may move.

The temperature deriving unit 204 measures the temperature of the molten pool 250 based on the luminance of the image captured by the camera 203. The scanning direction determiner 205 determines the relative scanning direction of the light beam 240, that is, a direction in which the material 230 is shaped on the X-Y plane. The scanning direction determiner 205 determines the scanning direction (moving direction) of the shaping table 220 based on a change in the position of the shaping table 220, for example, a change in the machine coordinate position of an NC (Numerical Control) apparatus, thereby determining the scanning direction of the light beam 240. Then, the shape determiner 206 detects the molten pool 250 based on the luminance of the image captured by the camera 203 and the relative scanning direction of the light beam 240 determined by the scanning direction determiner 205.

The shaping controller 207 adjusts the output of the light beam 240 based on the size of the molten pool 250 determined by the shape determiner 206. The shaping controller 207 detects the width (the size thereof) of the molten pool 250 in a direction perpendicular to the relative scanning direction of the light beam, and controls one or both of the output and scanning speed of the light beam 240 based on the detected width size.

If, for example, the detected width is larger than the width of a shaping model, the material 230 is melted too much, and it can be determined that the shape of the molten pool 250 has a wide width. Thus, the shaping controller 207 decreases the output of the light beam 240. That is, the shaping controller 207 decreases the amount of heat to be applied to the material 230, thereby suppressing the amount of the melted material 230. However, if the output of the light beam 240 is significantly decreased, the material 130 is not melted completely, and thus the molten pool 250 is not formed. In this case, the width of the molten pool 250 is adjusted by increasing the scanning speed without setting the output of the light beam 240 to a given value or less.

To the contrary, if the detected width is smaller than the width of the shaping model, the amount of the melted material 230 is small, and the shape of the molten pool 250 has a narrow width. Thus, the shaping controller 207 increases the output of the light beam 240 to increase the amount of heat to be applied to the material 230, thereby increasing the amount of the melted material 230.

The scanning speed may be adjusted in the same manner. For example, if the detected width is larger than the width of the shaping model, the material 230 is melted too much, and it can be determined that the shape of the molten pool 250 has a wide width. Thus, the shaping controller 207 increases the scanning speed of the light beam 240. That is, the shaping controller 207 decreases the amount of heat to be applied to the material 230, thereby suppressing the amount of the melted material 230. If, however, the scanning speed of the light beam is set too high, the material 130 is not melted completely, and thus the molten pool 250 is not formed. In this case, the width of the molten pool 250 is adjusted by increasing the output of the light beam 240 without setting the scanning speed of the light beam 240 to a given speed or lower.

To the contrary, if the detected width is smaller than the width of the shaping model, the amount of the melted material 230 is small, and the shape of the molten pool 250 has a narrow width. Thus, the shaping controller 207 decreases the scanning speed to increase the amount of heat to be applied to the material 230, thereby increasing the amount of the melted material 230.

The shaping model acquirer 208 acquires the shaping model of the three-dimensional laminated and shaped object to be used by the three-dimensional laminating and shaping apparatus 200. The shaping model is data about the three-dimensional laminated and shaped object to be used by the three-dimensional laminating and shaping apparatus 200 to execute shaping of the three-dimensional laminated and shaped object. The three-dimensional laminating and shaping apparatus 200 executes shaping of the three-dimensional laminated and shaped object based on the data.

The shaping shape determiner 209 specifies the shaping shape of the three-dimensional laminated and shaped object based on the size of the molten pool 250. That is, the shaping shape determiner 209 specifies the shape of the actually shaped three-dimensional laminated and shaped object based on the video of the molten pool 250 captured by the camera 203, the shape of the molten pool 250, and the like.

The cutting path decider 210 decides the cutting path of the three-dimensional laminated and shaped object by comparing the shaping model with the shaping shape of the actually shaped three-dimensional laminated and shaped object. That is, the three-dimensional laminating and shaping apparatus 200 executes shaping of the three-dimensional laminated and shaped object in accordance with the shaping model. However, the shape of the actually shaped three-dimensional laminated and shaped object does not always match the shape of the shaping model, thereby causing a difference between the shapes. The three-dimensional laminating and shaping apparatus 200 cuts, by a cutting tool (not shown), a portion of the three-dimensional laminated and shaped object, which extends from the shaping line of the shaping model, thereby correcting the difference from the shape of the shaping model.

Figure 3A:
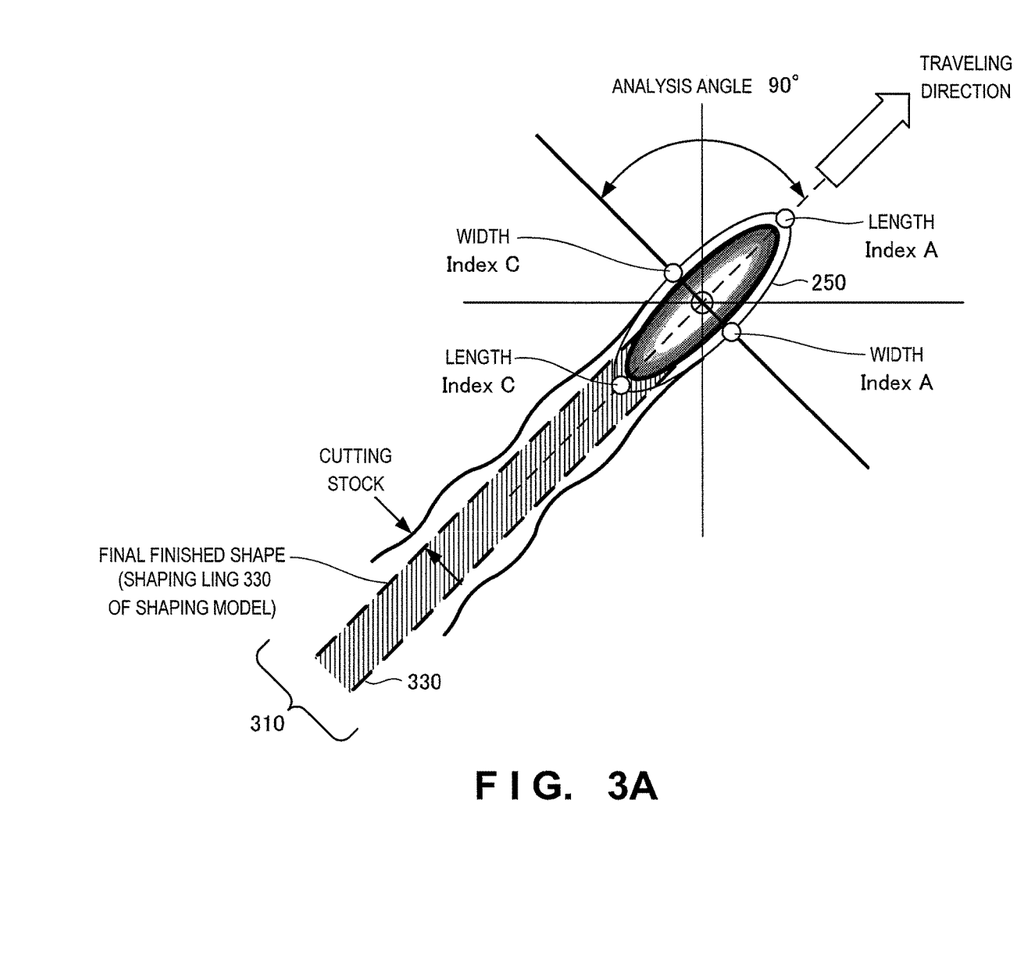
FIG. 3A is a view showing an example of an image obtained by capturing a molten pool formed by the three-dimensional laminating and shaping apparatus according to the second embodiment of the present invention.

FIG. 3A is a view showing an example of the image obtained by capturing the molten pool 250 formed by the three-dimensional laminating and shaping apparatus 200 according to this embodiment. As shown in FIG. 3A, the shape of the molten pool 250 is an elliptic shape which is long in the traveling direction of the light beam 240. That is, the shape of the molten pool 250 is an elliptic shape which is long in the traveling direction of the light beam 240 and is short in a direction perpendicular to the traveling direction. The center of the molten pool 250 is irradiated with the light beam 240. An analysis angle shown in FIG. 3A indicates an angle between the traveling direction and a direction in which the camera 203 captures an image.

Referring to FIG. 3A, the light beam 240 travels in the upper right direction in FIG. 3A, and the molten pool 250 on the opposite side with respect to the traveling direction (scanning direction) of the light beam 240, that is, a place which the light beam 240 passes through is not supplied with heat by the light beam 240 anymore, and thus is cooled and solidified. Since, however, the three-dimensional laminating and shaping apparatus 200 cannot control the melting rate and solidification rate of the material 230, the shape of a three-dimensional laminated and shaped object 310 does not match a final finished shape (the shaping line of the shaping model) 330.

Figure 3B:
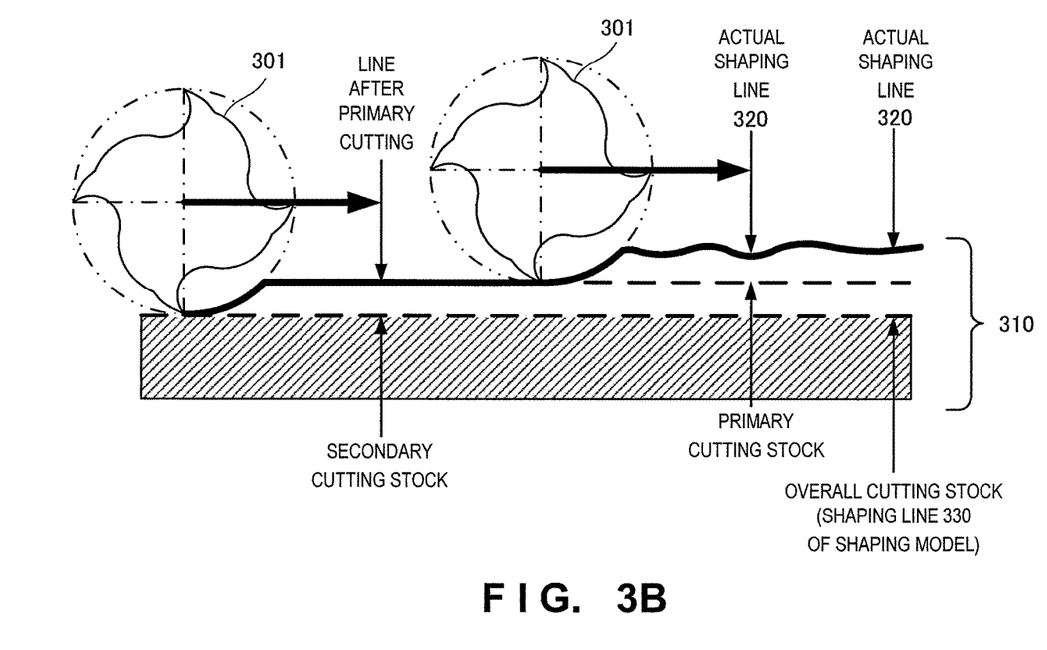
FIG. 3B is a plan view for schematically explaining cutting by the three-dimensional laminating and shaping apparatus according to the second embodiment of the present invention.

FIG. 3B is a plan view for schematically explaining cutting by the three-dimensional laminating and shaping apparatus 200 according to this embodiment. In the three-dimensional laminating and shaping apparatus, dimensions in which the material is melted and solidified change depending on the shape and shaping speed of the three-dimensional laminated and shaped object to be laminated.

During laminating and shaping of the three-dimensional laminated and shaped object 310, the three-dimensional laminating and shaping apparatus 200 performs cutting by a decided cutting stock based on the video of the molten pool 250 captured by the camera 203.

Note that cutting may be performed after completion of shaping of the three-dimensional laminated and shaped object. Alternatively, cutting may be performed every time shaping of one layer ends or upon end of shaping of some layers.

Figure 4A:
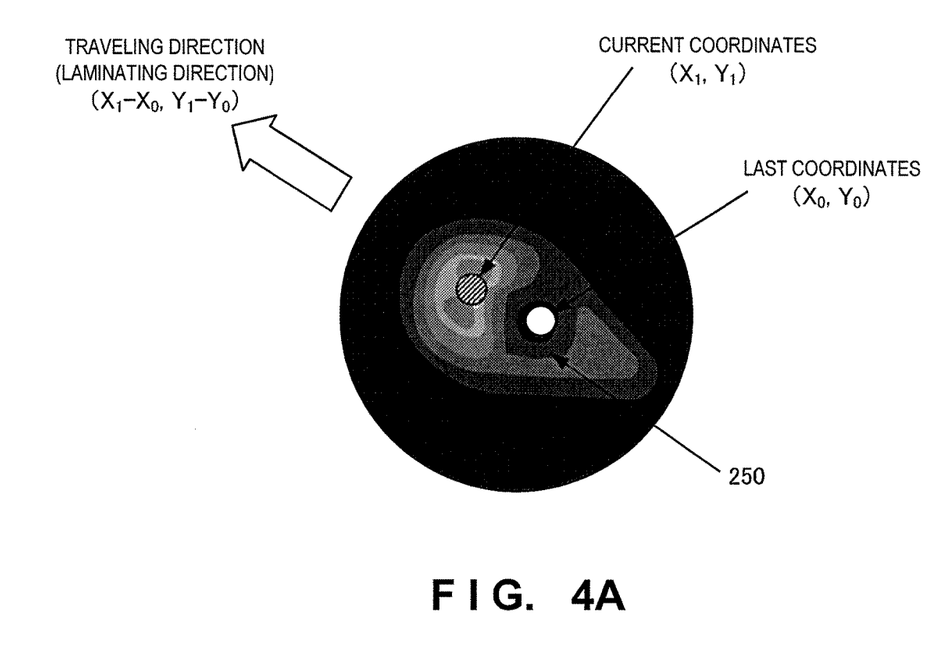
FIG. 4A is a view showing an example of the image of the molten pool formed by the three-dimensional laminating and shaping apparatus according to the second embodiment of the present invention.

FIG. 4A is a view showing an example of the image of the molten pool 250 shaped by the three-dimensional laminating and shaping apparatus 200 according to this embodiment. During shaping of the three-dimensional laminated and shaped object, the traveling direction of the light beam 240 changes in accordance with the shape to be laminated, and it is thus difficult to determine the traveling direction based on only the image obtained by capturing the molten pool 250. To cope with this, the scanning direction determiner 205 determines the traveling direction based on a change in the position of the shaping table 220, that is, a change in the machine coordinate position of the NC apparatus.

In the three-dimensional laminating and shaping apparatus 200, the ejection nozzle 201 is fixed and the shaping table 220 moves to relatively move the light beam 240. Since the three-dimensional laminating and shaping apparatus 200 always grasps the machine coordinate position of the shaping table 220, the scanning direction determiner 205 determines the traveling direction of the light beam 240 based on a change in the machine coordinate position.

Figure 4B:
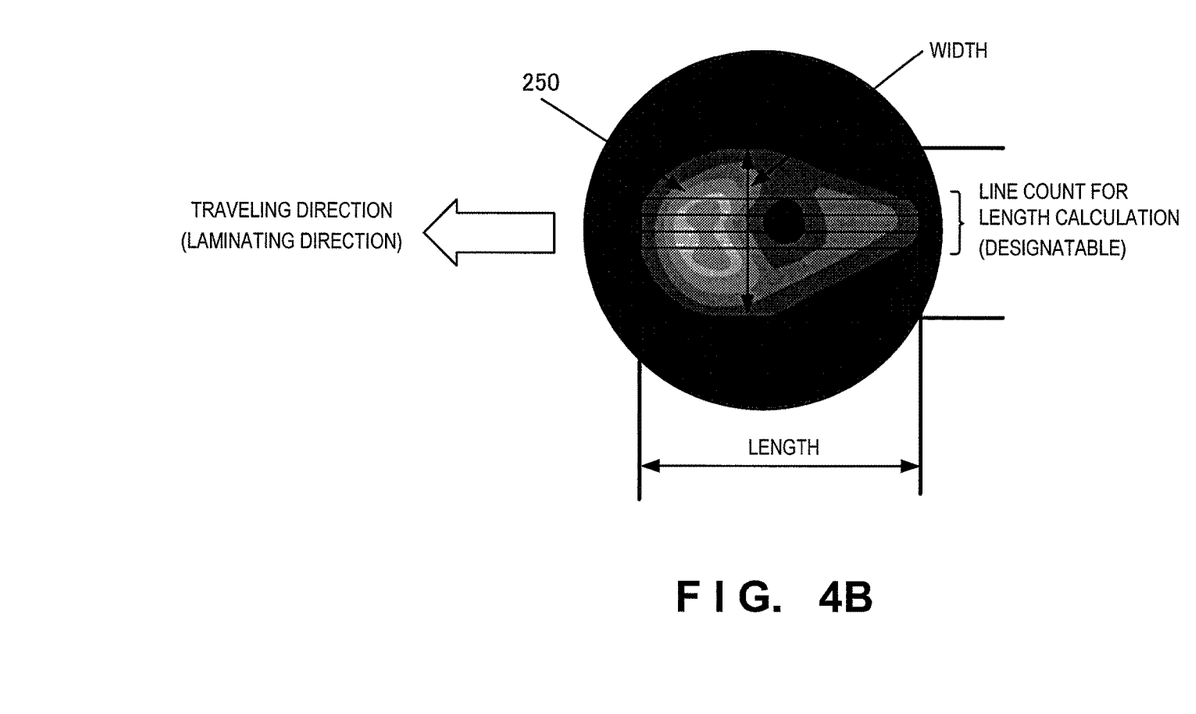
FIG. 4B is a view for explaining a method of deriving the width and length of the molten pool from the image of the molten pool formed by the three-dimensional laminating and shaping apparatus according to the second embodiment of the present invention.

FIG. 4B is a view for explaining a method of deriving the width and length of the molten pool from the image of the molten pool 250 formed by the three-dimensional laminating and shaping apparatus 200 according to this embodiment. For example, the shaping controller 207 determines, as the molten pool 250, a pixel region having a luminance value exceeding a predetermined threshold, and obtains a melt pool length as the length of the molten pool 250 in the traveling direction of the light beam 240. The shaping controller 207 obtains the length, in a direction (vertical direction) perpendicular to the scanning direction of the light beam 240, of a region having a luminance value equal to or larger than a given value, that is, the width of the molten pool 250.

Figure 5:
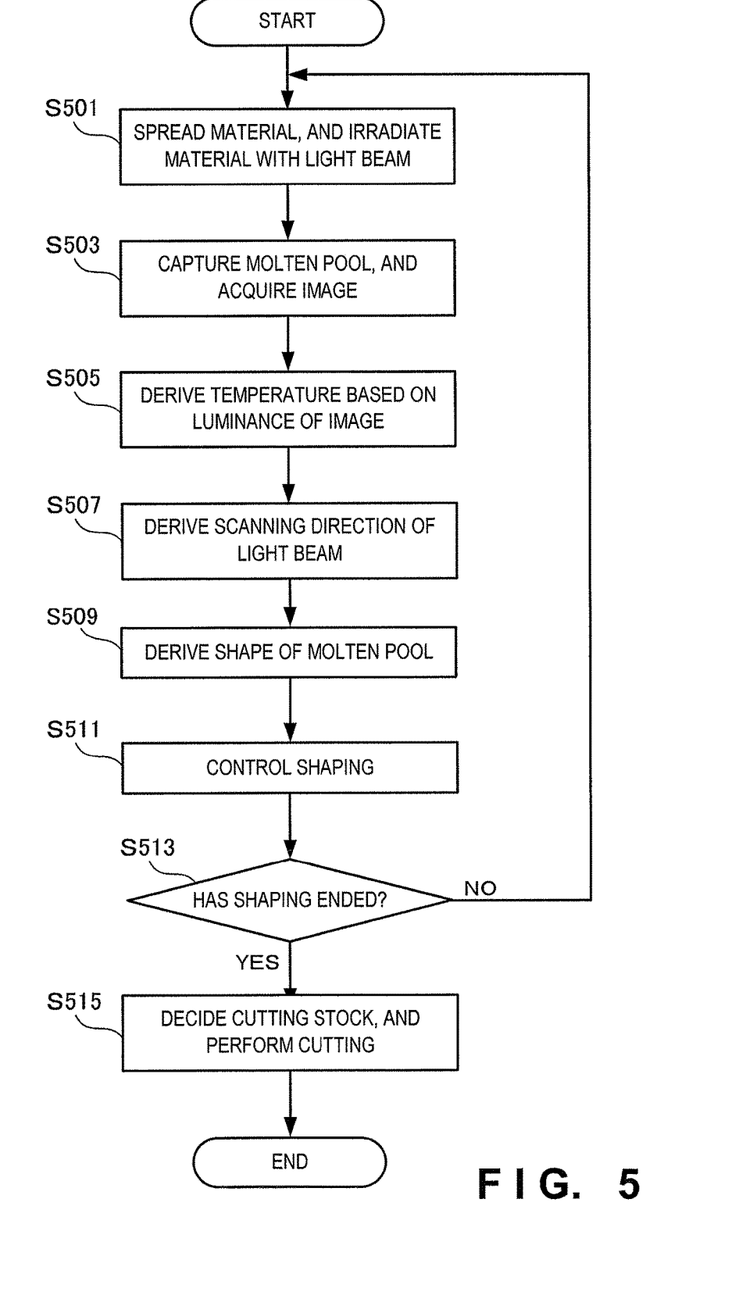
FIG. 5 is a flowchart for explaining the processing procedure of the three-dimensional laminating and shaping apparatus according to the second embodiment of the present invention.

FIG. 5 is a flowchart for explaining the processing procedure of the three-dimensional laminating and shaping apparatus 200 according to this embodiment. In step S501, the three-dimensional laminating and shaping apparatus 200 ejects the material 230 onto the shaping table 220, and irradiates the material 230 with the light beam 240 from the light beam irradiator 202. The three-dimensional laminating and shaping apparatus 200 acquires, for example, the shaping model of a three-dimensional laminated and shaped object, creates an ejection plan of the material 230 and an irradiation plan of the light beam 240 based on the acquired shaping model, and executes shaping of the three-dimensional laminated and shaped object in accordance with the created ejection plan and irradiation plan.

In step S503, the three-dimensional laminating and shaping apparatus 200 captures the molten pool 250 by the camera 203, and acquires an image of the molten pool 250. In step S505, the three-dimensional laminating and shaping apparatus 200 derives the temperature of the molten pool 250 based on the luminance of the acquired image of the molten pool 250. In step S507, the three-dimensional laminating and shaping apparatus 200 determines the traveling direction of the light beam 240 based on a change in the position (machine coordinate position) of the shaping table 220. In step S509, the three-dimensional laminating and shaping apparatus 200 derives the shape of the molten pool 250 based on the temperature of the molten pool 250 and the scanning direction. In step S511, one or both of the output and scanning speed of the light beam 240 are controlled based on the shape of the molten pool 250.

In step S513, the three-dimensional laminating and shaping apparatus 200 determines whether shaping of the three-dimensional laminated and shaped object has ended. If shaping of the three-dimensional laminated and shaped object has not ended (NO in step S513), the three-dimensional laminating and shaping apparatus 200 returns to step S501 to repeat the subsequent steps; otherwise (YES in step S513), the three-dimensional laminating and shaping apparatus 200 advances to step S515. In step S515, the three-dimensional laminating and shaping apparatus 200 decides a cutting stock based on the shape of the molten pool 250, and cuts the cutting stock. Note that the insertion position of step S515 is not limited to the position shown in FIG. 5. For example, step S515 may be inserted between steps S511 and S513.

According to this embodiment, it is possible to perform light beam output control, shaping speed control, and cutting control based on an image captured by the camera or the like. Furthermore, since a cutting path is decided based on the actual laminating shape, the cutting time can be shortened. If a cutting stock is decided after completion of shaping, it is difficult to decide the cutting stock at a place where the shape of the shaped object is complicated. However, since the cutting stock is decided during laminating and shaping, it is possible to readily and accurately decide the cutting stock, thereby improving the shaping accuracy of the three-dimensional laminated and shaped object.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
    a material ejector that ejects a material of a three-dimensional laminated and shaped object onto a shaping table;
    a light beam irradiator that irradiates the ejected material with a light beam;
    an image capturer that captures a molten pool formed by irradiating the ejected material with the light beam;
    a scanning direction determiner that determines a scanning direction of the light beam with respect to a shaped object based on a change in a position of the shaping table;
    a detector that detects the molten pool based on an image captured by said image capturer and the scanning direction; and
    a shaping controller that controls at least one of an output of the light beam and a scanning speed of the light beam based on the detected molten pool, wherein said shaping controller controls at least one of the output of the light beam and the scanning speed of the light beam by comparing a width of the molten pool in a direction perpendicular to the scanning direction with a shaping width of the shaping model of the three-dimensional laminated and shaped object.

2. The three-dimensional laminating and shaping apparatus according to claim 1, further comprising: a shaping shape determiner that determines a shape of the three-dimensional laminated and shaped object based on the molten pool; and a cutting path decider that decides a cutting path of the three-dimensional laminated and shaped object by comparing the shaping model with the determined shaping shape of the three- dimensional laminated and shaped object.

3. The three-dimensional laminating and shaping apparatus according to claim 1, wherein said detector detects the molten pool based on a luminance of the image and the scanning direction.

4. The three-dimensional laminating and shaping apparatus according to claim 1, further comprising:
    a temperature deriving unit that derives a temperature of the molten pool based on the luminance,
    wherein said detector further detects the molten pool based on the temperature of the molten pool.

5. The three-dimensional laminating and shaping apparatus according to claim 1, wherein said shaping controller controls both said output of the light beam and said scanning speed of the light beam to adjust the width of the molten pool to the shaping width of the shaping model.

6. The three-dimensional laminating and shaping apparatus according to claim 5, wherein when the width of the molten pool is larger than the shaping width of the shaping model, said shaping controller decreases the output of the light beam and, if the output of the light beam is decreased to less than the shaping width of the shaping model, the controller increases the scanning speed of the light beam to increase the width of the molten pool.

7. The three-dimensional laminating and shaping apparatus according to claim 5, wherein when the width of the molten pool is larger than the shaping width of the shaping model, said shaping controller increases the scanning speed of the light beam and, if the output of the light beam is decreased to less than the shaping width of the shaping model, the controller increases the output of the light beam to increase the width of the molten pool.

8. The three-dimensional laminating and shaping apparatus according to claim 1, wherein the shaping controller increases or decreases the width of the molten pool by decreasing or increasing the scanning speed of the light beam.

9. The three-dimensional laminating and shaping apparatus according to claim 1, wherein the shaping controller increases or decreases the width of the molten pool by increasing or decreasing the output of the light beam.

10. A three-dimensional laminated and shaped object shaping method comprising:
    ejecting a material of a three-dimensional laminated and shaped object onto a shaping table;
    irradiating the ejected material with a light beam;
    capturing a molten pool formed by irradiating the ejected material with the light beam;
    determining a scanning direction of the light beam with respect to a shaped object based on a change in a position of the shaping table;
    detecting the molten pool based on an image captured by an image capturer and the scanning direction; and
    controlling at least one of an output of the light beam and a scanning speed of the light beam based on the detected molten pool.

11. A non-transitory computer readable medium storing a three-dimensional laminated and shaped object shaping program for causing a computer to execute a method, comprising:
    ejecting a material of a three-dimensional laminated and shaped object onto a shaping table;
    irradiating the ejected material with a light beam;
    capturing a molten pool formed by irradiating the ejected material with the light beam;
    determining a scanning direction of the light beam with respect to a shaped object based on a change in a position of the shaping table;
    detecting the molten pool based on an image captured by an image capturer and the scanning direction; and
    controlling at least one of an output of the light beam and a scanning speed of the light beam based on the detected molten pool by comparing a width of the molten pool in a direction perpendicular to the scanning direction with a shaping width of the shaping model of the three-dimensional laminated and shaped object.

* * * * *